(12) United States Patent
Pandit

(10) Patent No.: US 8,651,903 B1
(45) Date of Patent: Feb. 18, 2014

(54) HYDRO-PROPULSION APPARATUS

(76) Inventor: Sudhir Pandit, Amity, AR (US)

(*) Notice: Subject to any disclaimer, the term of this patent is extended or adjusted under 35 U.S.C. 154(b) by 311 days.

(21) Appl. No.: 13/229,989

(22) Filed: Sep. 12, 2011

(51) Int. Cl.
*B63H 1/30* (2006.01)

(52) U.S. Cl.
USPC ........................................................ 440/13

(58) Field of Classification Search
USPC ...................................... 440/13–16
See application file for complete search history.

(56) References Cited

U.S. PATENT DOCUMENTS

| | | | | |
|---|---|---|---|---|
| 1,444,847 A * | 2/1923 | Miller | | 440/14 |
| 1,646,178 A * | 10/1927 | Zach | | 440/13 |
| 1,925,912 A * | 9/1933 | Strout | | 440/14 |
| 2,062,546 A * | 12/1936 | Wells | | 440/14 |
| 2,097,931 A * | 11/1937 | Martin | | 440/14 |
| 2,213,538 A * | 9/1940 | Whitehead | | 416/74 |
| 2,364,255 A * | 12/1944 | Troth | | 440/14 |
| 2,365,415 A * | 12/1944 | Kruse | | 416/74 |
| 2,696,797 A * | 12/1954 | Whidden | | 440/14 |
| 2,809,604 A * | 10/1957 | Meredith | | 440/14 |
| 2,958,306 A * | 11/1960 | Haxton et al. | | 440/13 |
| 2,987,030 A * | 6/1961 | De Jean, Jr. | | 440/15 |
| 3,038,435 A * | 6/1962 | Fairfax | | 440/13 |
| 3,361,106 A * | 1/1968 | Hildebrand | | 440/15 |
| 3,620,019 A * | 11/1971 | Munte | | 60/221 |
| 3,834,343 A * | 9/1974 | Hopkins | | 440/14 |
| 4,345,903 A * | 8/1982 | Laser | | 440/14 |
| 4,642,056 A * | 2/1987 | Keivanjah | | 440/15 |
| 5,106,331 A * | 4/1992 | Lizarazu | | 441/55 |
| 5,273,238 A * | 12/1993 | Sato | | 244/105 |
| 6,077,134 A * | 6/2000 | Lam | | 440/12.62 |
| 6,964,589 B1 * | 11/2005 | Lin | | 440/14 |
| 6,997,765 B1 * | 2/2006 | McGuinness | | 440/14 |
| 7,396,267 B1 * | 7/2008 | Parker | | 440/105 |
| 7,913,485 B2 * | 3/2011 | Butler et al. | | 60/221 |
| 8,187,044 B2 * | 5/2012 | Jemt | | 440/13 |
| 8,419,487 B2 * | 4/2013 | Parker | | 440/13 |
| 2003/0216091 A1 * | 11/2003 | Wang et al. | | 440/14 |
| 2007/0212954 A1 * | 9/2007 | Garwood | | 440/13 |
| 2008/0076308 A1 * | 3/2008 | Green | | 440/48 |
| 2011/0039460 A1 * | 2/2011 | Parker | | 440/13 |

* cited by examiner

*Primary Examiner* — Daniel V Venne
(74) *Attorney, Agent, or Firm* — Gulf Coast Intellectual Property Group

(57) ABSTRACT

A hydro-propulsion system operably coupled to a watercraft wherein the hydro-propulsion system functions to propel the watercraft. The hydro-propulsion system further includes a fluid chamber being modified-triangular in shape having walls, a bottom and a top forming an interior volume. A plurality of inlets are formed within the walls of the fluid chamber and function to allow water to flow into the interior volume thereof. An aft opening is present and is configured to allow water to flow outward from the interior volume of the fluid chamber. Disposed within the interior volume is a propulsion member that is generally rectangular in shape having a first end and a second end. The propulsion member is movably mounted within the interior volume so as to laterally oscillate proximate the second end. The hydro-propulsion system includes a leverage apparatus operably coupled to the propulsion member so as to control the movement thereof.

11 Claims, 4 Drawing Sheets

HYDRO-PROPULSION APPARATUS

FIELD OF THE INVENTION

The present invention relates to hydrodynamic propulsion systems, more specifically but not by way of limitation, a propulsion system operably secured to a water vessel wherein the propulsion system utilizes a member operable to move in lateral oscillating pattern to create forward thrust for the water vessel.

BACKGROUND

For centuries, mankind has traveled on the water utilizing various types of vessels having alternative marine propulsion systems. Exemplary types of marine propulsion systems includes oars, sails and engine driven propellers and power operated jet drives. Marine propulsion systems have not advanced substantially since the screw propeller and most modern advancements are focused on the power source for the propeller or the hull shape of the vessel. It has been identified in numerous different studies that the propeller dissipates energy in various directions and the thrust produced by the propeller is not focused in the most efficient direction to maximize the forward movement of the water vessel. Furthermore, screw propeller operated vessels pose a significant safety hazard to individuals in the water that are proximate the propeller.

Power operated jet drives are utilized to propel water vessels of various sizes and provide another example of the stagnant development in the field of marine propulsion technology. While water jet drives do provide some safety features when compared to screw propeller propulsion systems, jet drives are much less efficient than screw propeller system in transferring the energy input to propulsion power. Additionally, watercraft with these types of propulsion systems have proven to be exceptionally difficult to maneuver at low speeds. Both the propeller and jet drive propulsion systems typically utilize combustion motors that introduce pollutants such as gas and oil into the water systems in which they are operated resulting in potential damage to marine life. These types of propulsion systems further produce a significant amount of noise that can disrupt sensitive marine environments.

Another example of an inefficient marine propulsion system are conventional oars. While used primarily for small recreational boats, oars cannot be leveraged by the user effectively and at least half of the movement required to manipulate the oars results in no forward movement of the vessel.

Accordingly there is a need for a marine propulsion system that provides an improved directional thrust along a vector providing a more efficient propulsion of a marine watercraft wherein the propulsion system further provides a reduced safety hazard to individuals and marine life proximate the marine propulsion system.

SUMMARY OF THE INVENTION

It is the object of the present invention to provide marine propulsion system operably coupled to a watercraft that provides propulsion of the watercraft utilizing a directional thrust of water.

Another object of the present invention is to provide a marine propulsion system that includes a pivoting member that is oscillated in a lateral motion so as to create thrust.

Yet another object of the present invention is to provide a marine propulsion system that includes a hydrodynamic shaped containment chamber to direct the thrust produced by the pivoting member.

Still another object of the present invention is to provide a marine propulsion system wherein the containment chamber is mounted to the bottom of the watercraft.

A further object of the present invention is to provide a marine propulsion system wherein the containment chamber further includes at least one valve operable to allow water to enter the containment chamber.

An additional object of the present invention is to provide a marine propulsion system wherein the containment chamber further includes directional vanes to control the water turbulence propagating from the containment chamber.

Still a further object of the present invention is to provide a marine propulsion system that includes a rod operably coupled to the pivoting member that extends through the hull of the watercraft and provides an interface to manipulate the pivoting member.

A further object of the present invention is to provide a marine propulsion system that further incorporates additional components operable to translate the vertical movement of waves so as to operate the oscillating pivot member to provide thrust to a watercraft.

Yet another object of the present invention is to provide several embodiments members operable to engage the rod operably coupled to the pivoting member so as to provide leverage and efficient rotation of the rod.

It is the object of the present invention to provide a marine propulsion system that is adaptable to be integrated with numerous different types of watercraft.

A further object of the present invention is to provide a marine propulsion system that poses significantly reduced risk to individuals and marine life proximate thereto.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
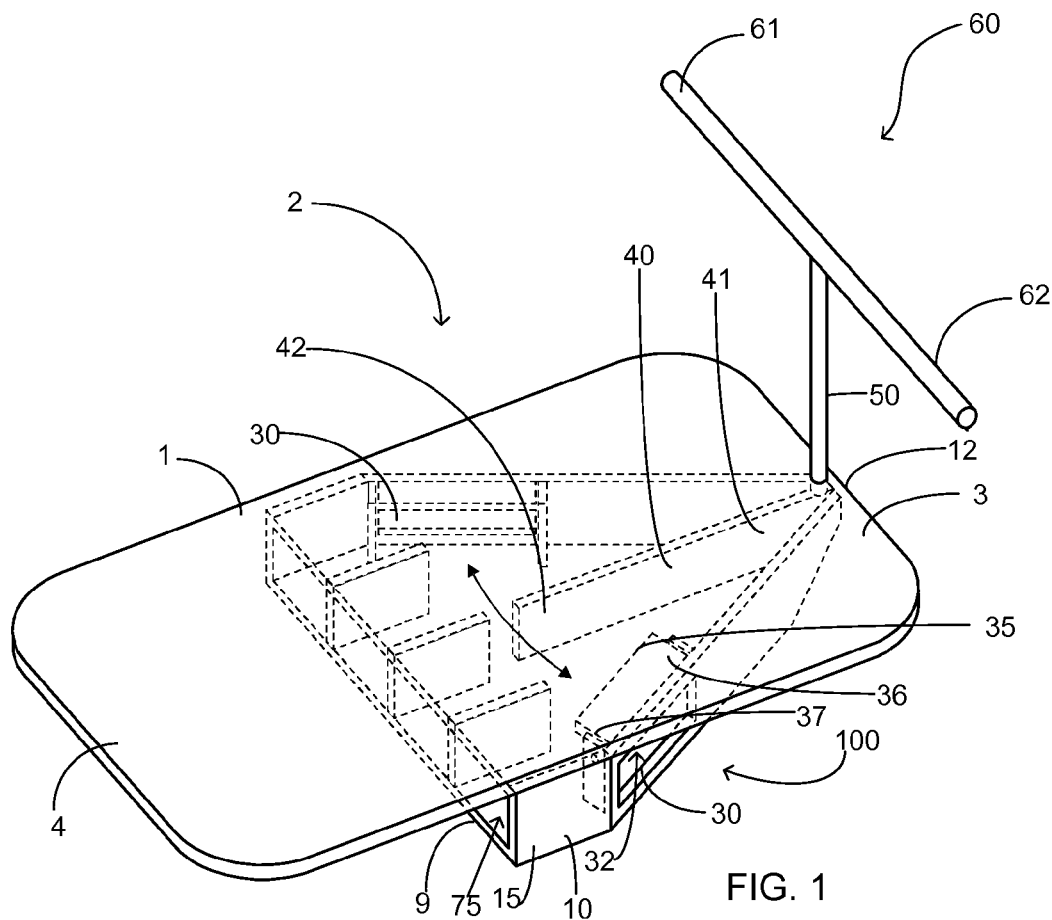
FIG. 1 is a perspective view of an embodiment of a watercraft having the hydro-propulsion system of the present invention.

Referring now to the drawings submitted herewith, wherein various elements depicted therein are not necessarily drawn to scale and wherein through the views and figures like elements are referenced with identical reference numerals, there is illustrated a hydro-propulsion system 100 constructed according to the principles of the present invention.

Figure 2:
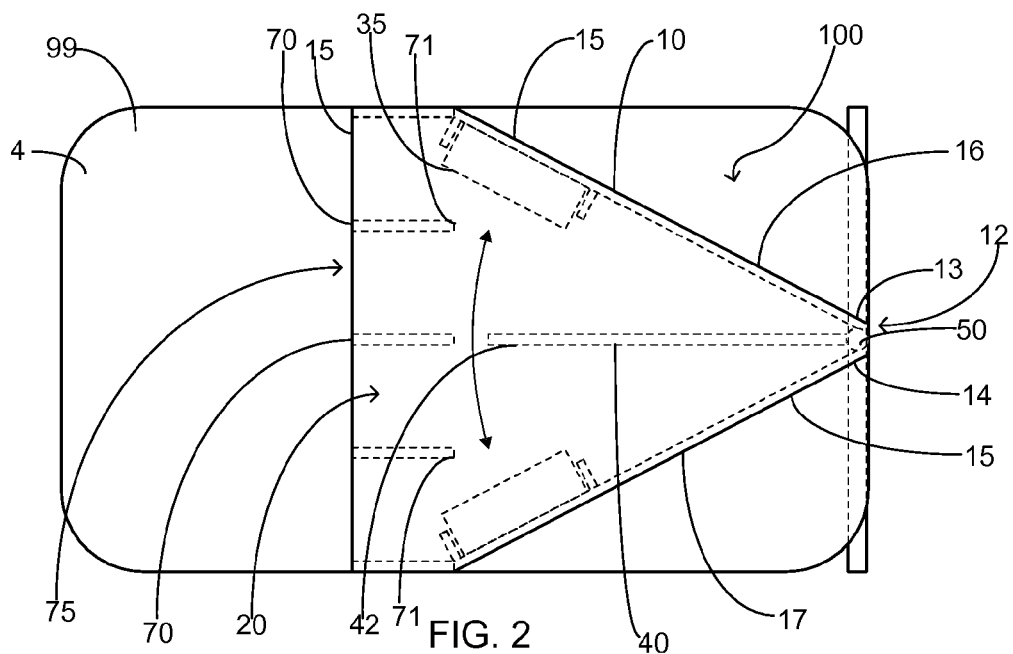
FIG. 2 is a bottom view of the hydro-propulsion system of the present invention operably secured to the watercraft embodiment illustrated in FIG. 1.
Figure 3:
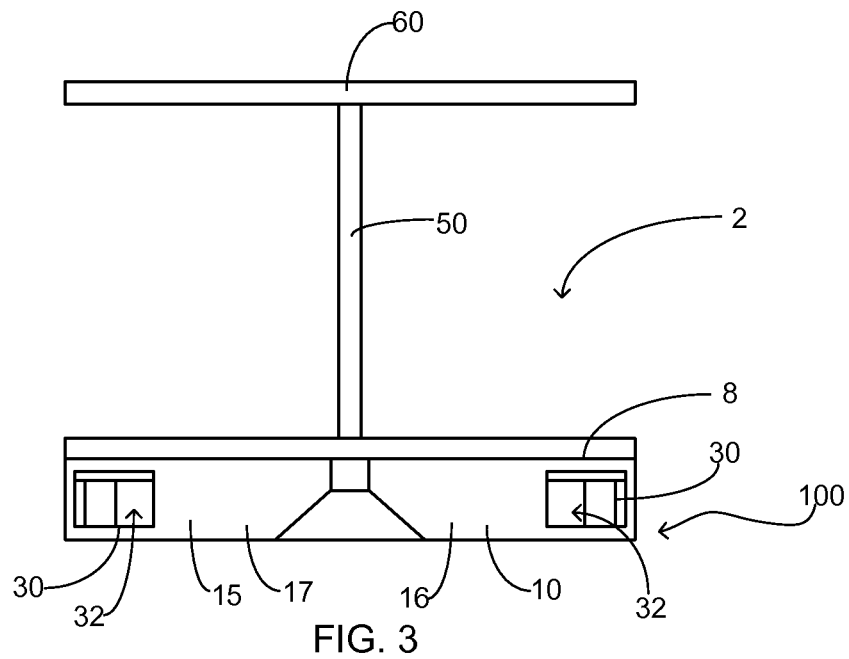
FIG. 3 is a front view of the hydro-propulsion system of the present invention operably secured to the watercraft embodiment of FIG. 1.
Figure 4:
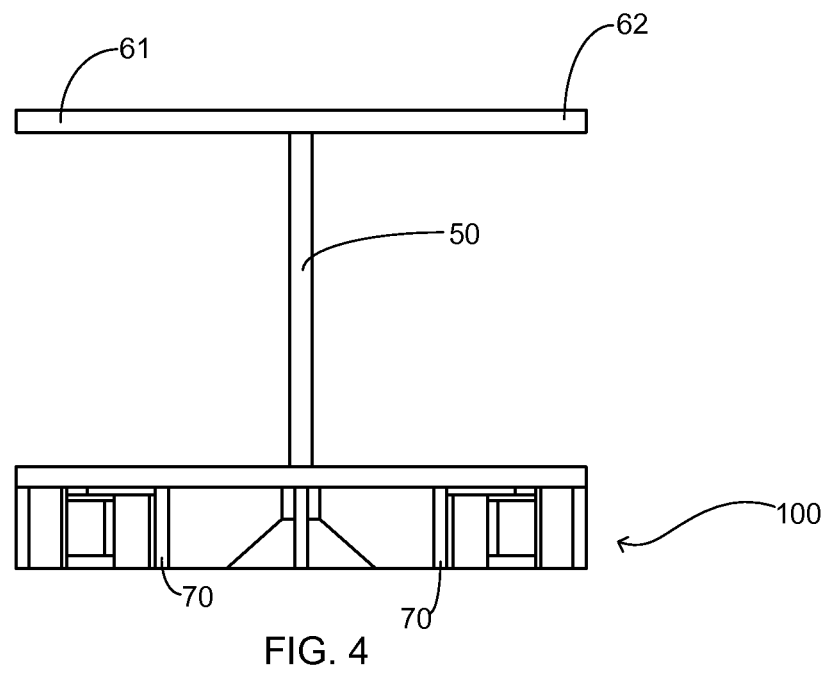
FIG. 4 is a rear view of the hydro-propulsion system of the present invention operably secured to the watercraft embodiment of FIG. 1.

As particularly shown in FIGS. 1 and 2, the hydro-propulsion system 100 further includes a fluid chamber 10 constructed of a plurality of walls 15, a bottom 9, and top 8 forming an interior volume 20. The hydro-propulsion system 100 is mounted to the exemplary watercraft 2 such that the apex 12 of the fluid chamber 10 is proximate the bow 3 of the exemplary watercraft 2. The fluid chamber 10 is generally modified-triangular in shape so as to provide an efficient hydrodynamic shape and reduce the drag created by the fluid chamber 10 as the exemplary watercraft 2 is propelled through the water. While good results have been achieved utilizing a fluid chamber 10 that is generally triangular in shape, it is contemplated within the scope of the present invention that the fluid chamber 10 could be manufactured in numerous different shapes having a plurality of walls 15 and accomplish the objectives as described herein. The walls 15 of the fluid chamber 10 are manufactured from a suitable durable material such as but not limited to aluminum or fiberglass and are secured utilizing suitable mechanical techniques or welding.

The fluid chamber 10 includes a first wall 16 and second wall 17 that are secured to each other at ends 13, 14 utilizing suitable techniques proximate the apex 12. The first wall 16 and second wall 17 have integrally formed therein an inlet valve 30. The inlet valve 30 functions to allow water to flow into the interior volume 20 of the fluid chamber 10 as the exemplary watercraft 2 is propelled through the water. The inlet valve 30 is generally rectangular in shape having an opening 32. Hingedly attached to the opening 32 is the inlet valve control member 35. The inlet valve control member 35 is sized so as to substantially cover the opening 32. The inlet valve control member 35 is hingedly attached proximate the upper left corner 36 and upper right corner 37 utilizing directionally biased hinges. Utilization of directionally biased hinges facilitates the inward movement of the inlet valve control member 35 such that the inlet valve control member 35 hinges inward towards the interior volume 20 while restricting the movement of the inlet valve control member 35 beyond planar alignment with the wall 15 in an outward direction. The inlet valve control member 35 functions to control the water flow through the inlet valve 30. As shown in particular in FIG. 1 in its second position, the inlet valve control member 35 is positioned such that it is substantially perpendicular to the wall 15 thus allowing water to enter opening 32 and flow into the interior volume 20. Those skilled in the art will recognize that numerous configurations of the inlet valve control member 35 could be utilized to control the flow of water into fluid chamber 10 such that the flow of water is uni-directional and the water will not egress from the inlet valve 30 during operation of the exemplary watercraft 2. While the inlet valve 30 is illustrated as being rectangular in shape, it is further contemplated within the scope of the present invention that the inlet valve 30 could be formed in numerous different shapes. Additionally, while the embodiment of the hydro-propulsion system 100 has illustrated herein one inlet valve 30 in the first wall 16 and one inlet valve 30 in the second wall 17, it is further contemplated within the scope of the present invention that more than one inlet valve 30 could be formed in either the first wall 16 or second wall 17.

Disposed within the fluid chamber 10 is the propulsion member 40. The propulsion member 40 is generally rectangular in shape having a first end 41 and a second end 42. The propulsion member 40 is manufactured from a suitable durable material such as but not limited to metal or fiberglass. The propulsion member 40 is movably mounted within the interior volume 20 of the fluid chamber 10 and functions to be laterally oscillated via rotation of shaft 50. The propulsion member 40 is secured to shaft 50 utilizing suitable durable techniques. As the shaft 50 is rotated by pivotal movement of the left portion 61 and right portion 62 of the handle 60, the propulsion member 40 is laterally oscillated within the interior volume of the fluid chamber 10. An exemplary propulsion stroke for the watercraft 2 is as follows. A linear force is applied to the right portion 62 of the handle 60 such that the right portion 62 is moved forward in the direction towards the bow 3. Additionally, a linear force is applied by a user to the left portion 61 of the handle such that the left portion 61 has been moved towards the stern 4 of the watercraft 2. As this simultaneous movement of the handle 60 occurs, the shaft 50 is partially rotated in a counterclockwise direction. As the shaft 50 is partially rotated in a counterclockwise direction, the propulsion member 40 being secured thereto, is moved in a lateral direction towards the starboard side 6 of the watercraft 2. As the propulsion member 40 is moved towards the second wall 17, the water disposed within the interior volume 20 intermediate the propulsion member 40 and the second wall 17 is forced towards the stern 4 of the watercraft 2. The triangular shape of the fluid chamber 10 facilitates the directional force of water towards the stern 4 during lateral oscillation as the distance between the first end 41 and the second wall 17 is less than that of the second end 42 and the second wall 17. This configuration facilitates the compression of the water intermediate thereto in the direction of the stern 4 of the watercraft 2. Furthermore, during this portion of the propulsion stroke, the inlet valve control member 35 is placed in its first position by the force of the water such that the inlet valve control member 35 prevents water egressing from the inlet valve 30.

To continue the propulsion stroke so as to laterally move the propulsion member 40 towards the port side 1 of the exemplary watercraft 2, the shaft 50 is rotated in a clockwise direction utilizing opposing forces on the right portion 62 and left portion 61 of the handle 60 so as to partially rotate the shaft 50 in a clockwise direction thus moving the propulsion member 40 towards the port side 1 of the exemplary watercraft 2 wherein the water disposed between the propulsion member 40 and the first wall 16 is forced outwards toward the stern 4. As this propulsion stroke is repeated, the water disposed within the interior volume 20 is forced outwards towards the directional vanes 70 thus propelling the exemplary watercraft 2. It is contemplated within the scope of the present invention that the shaft 50 could be manufactured in numerous different lengths so as to provide various amounts of leverage during the propulsion stroke. Additionally, a shaft 50 of different lengths could be utilized to accommodate a variety of different types of exemplary watercraft 2. Those skilled in the art will recognize that the shaft 50 could be manufactured from numerous suitable rigid materials and operably secured to the propulsion member 40 utilizing a variety of suitable techniques. While one propulsion member 40 is illustrated herein as being movably mounted within the interior volume 20 of the fluid chamber 10, it is contemplated within the scope of the present invention that more than one propulsion member 40 could be mounted within the fluid chamber 10. More specifically but not by way of limitation, two propulsion members 40 could be mounted within the interior volume 20 and operably move utilizing a rowing type motion having the appropriate mechanical fasteners to facilitate the translation of a conventional rowing movement utilizing the handle portion of oars so as to partially rotate a shaft and laterally oscillate the two propulsion members 40.

The fluid chamber 10 further includes rear opening 75. The rear opening 75 is proximate the stern 4 of the watercraft 2 and functions to permit the water disposed within the interior volume 20 to egress therefrom during the propulsion stroke. The rear opening 75 further includes a plurality of directional vanes 70. The directional vanes 70 are secured to the bottom 8 and top 9 wherein the directional vanes 70 are generally perpendicular thereto. The directional vanes 70 are manufactured from a suitable durable material and extend into the interior volume such that the ends 71 are just aft of the second end 42 of the propulsion member 40. The directional vanes 70 function to diminish the turbulence of the water flow as the water flow egresses from the rear opening 75 during a propulsion stroke. The directional vanes 70 function to substantially inhibit the formation of any recirculation of the water and produce a substantially laminar flow of water that propagates from the rear opening 75. Those skilled in the art will recognize that numerous amounts of directional vanes 70 could be mounted within the rear opening 75 so as to reduce water turbulence. It is further contemplated within the scope of the present invention that the directional vanes 70 could be movably mounted so as to provide directional steerage for the exemplary watercraft 2. This could be accomplished via a conventional mechanical linkage and associated element such as but not limited to a lever. Additionally, it is contemplated within the scope of the present invention that the water turbulence formation could be substantially inhibited utilizing another structure in addition to the directional vanes 70.

In a preferred embodiment, the hydro-propulsion system 100 is secured to the bottom 99 of the watercraft 2. It is contemplated within the scope of the present invention that the hydro-propulsion system 100 could be operably coupled to an exemplary watercraft of numerous configurations. More specifically but not by way of limitation, the hydro-propulsion system 100 could be operably coupled to a kayak, canoe or other small boat. Additionally, while one hydro-propulsion system 100 is illustrated in some of the embodiments disclosed herein, it is further contemplated within the scope of the present invention that more than one hydro-propulsion system 100 could be operably coupled to an exemplary watercraft. More specifically but not by way of limitation, a hydro-propulsion system 100 could be operably secured in such a manner as to facilitate operation as described herein wherein the hydro-propulsion system 100 is mounted to either side of an exemplary watercraft or aft of an exemplary watercraft.

Figure 5:
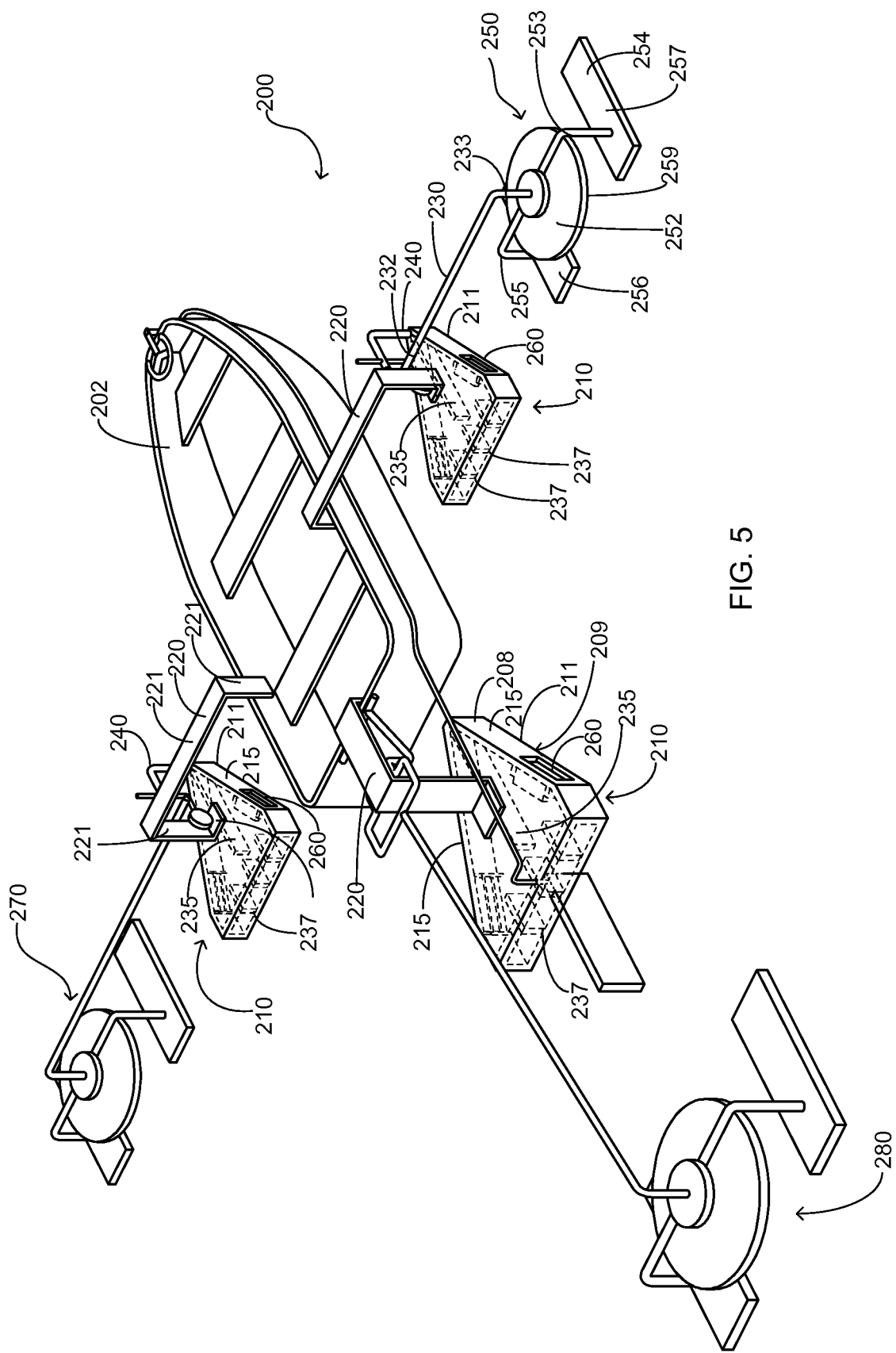
FIG. 5 is an alternative embodiment of the hydro-propulsion system of the present invention operably secured to a watercraft.

An alternative embodiment of the hydro-propulsion system 200 is illustrated in FIG. 5. The hydro-propulsion system 200 includes a plurality of fluid chambers 210 operably secured to an exemplary watercraft 202. The fluid chambers 210 are constructed similarly to the fluid chamber 10 as previously described herein having a body 211 that is generally triangular in shape with an interior volume being formed from a top 208, bottom 209 and walls 215. The fluid chambers 210 further include a propulsion member 235 operably coupled to shaft 240, inlet valves 260 and directional vanes 237 and provide a similar function as previously described herein for the propulsion member 40, inlet valve 30 and directional vanes 70. The fluid chambers 210 are secured to the exemplary watercraft 202 utilizing support arms 220. The support arms 220 are constructed of a suitable rigid material and function to secure the fluid chambers 210 to the exemplary watercraft 202. While the support arms 220 are illustrated herein being configured as having four sections 221, it is contemplated within the scope of the present invention that the support arms 220 could be configured in numerous different manners to achieve the functionality as described herein.

Secured to the top 208 of fluid chamber 210 is a first support boom 230. The first support boom 230 is generally rod-shaped and extends outward from the fluid chamber 210 in the opposite direction of the exemplary watercraft 202. The first support boom 230 includes a first end 232 that is operably secured to the shaft 240. The second end 233 of the first support boom 230 is operably coupled to the float apparatus 250. The float apparatus 250 further includes a positive buoyant member 252, a first negative buoyant member 254 and a second negative buoyant member 256. The float apparatus 250 functions to move the first support boom 230 in a vertical (upwards-downwards) direction so as to partially rotate the shaft 240 thereby laterally oscillating the propulsion member 235. The float apparatus 250 functions to move in an upwards-downwards direction as the float apparatus 250 traverses along the surface of a wave between the trough of a first wave to the crest and subsequently to the second trough of a conventional wave pattern. The float apparatus 250 has an overall positive buoyancy with the positive buoyant member 252 being constructed of a buoyant material and being substantially round in shape. The positive buoyant member 252 is operably coupled to the first negative buoyant member 254 with a first attachment arm 253 and is further coupled to the second negative buoyant member 256 with a second attachment arm 255. The first attachment arm 253 and second attachment arm 255 are constructed from a suitable durable material. The first negative buoyant member 254 and second negative buoyant member 256 are positioned such that the upper surface 257 is below that of the bottom 259 of the positive buoyant member 252. The first negative buoyant member 254 and second negative buoyant member 256 are generally rectangular in shape and function to provide a downward force as the float apparatus 250 traverses the portion of the wave from the crest of a wave downwards towards the trough of the wave. This movement causes the first support boom 230 to move in a downward direction and thus causes the shaft 240 to partially rotate so as to move the propulsion member 235. As the float apparatus 250 traverses along a wave from the trough to the crest, the positive buoyant member 252 moves the first support boom 230 in an upwards directions and thus causes the shaft 240 to partially rotate so as to move the propulsion member 235. As the float apparatus 250 traverses along the surface of a succession of waves from trough to crest and back to trough, the first support boom 230 is moved in an upwards-downwards direction. The shaft 240 is operably coupled with the appropriate fasteners, such as but not limited to pinion gears, so as to translate the upwards-downwards movement of the first support boom 230 into the partial rotation of the shaft 240 thus causing the propulsion member 235 to laterally oscillate and propel the exemplary watercraft 202.

As shown in particular in FIG. 5, the hydro-propulsion system 200 further includes a second float apparatus 270 and a third float apparatus 280 constructed in a similar manner as the float apparatus 250 described herein. The second float apparatus 270 and third float apparatus 280 function identically as the float apparatus 250 so as to provide additional propelling of the exemplary watercraft 202. It is contemplated within the scope of the present invention that the hydro-propulsion system 200 could have as few as one float apparatus operably coupled to one fluid chamber and provide the functionality as described herein.

Figure 6:
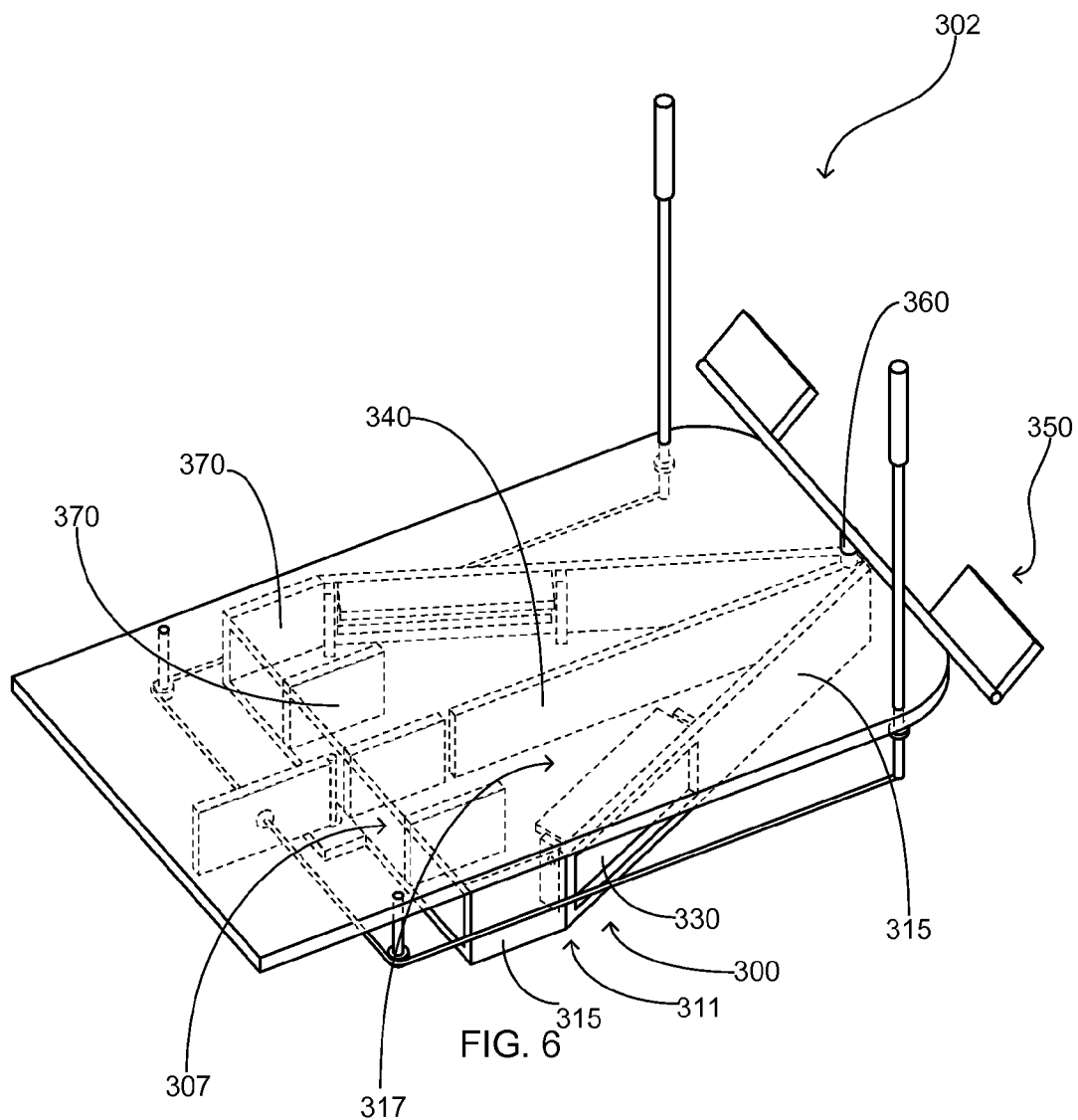
FIG. 6 is the hydro-propulsion system of the present invention operably secured to an alternative embodiment of a watercraft.

A further alternative embodiment of the hydro-propulsion system 300 is illustrated in FIG. 6 operably secured to an exemplary watercraft 302. The hydro-propulsion system 300 includes the elements previously discussed herein for the hydro-propulsion system 100 such as the propulsion member 340, walls 315, directional vanes 370 and inlet valve 330. The hydro-propulsion system 300 functions similarly to the hydro-propulsion system 100 wherein the propulsion member 340 is laterally oscillated within the interior volume 317 of the fluid chamber 311 propelling the water outward towards the rear opening 307. The adaptation for the hydro-propulsion system 300 is in the length of the shaft 360 operably coupled to the propulsion member 340. The length of the shaft 360 has been altered to accommodate the foot driven apparatus 350 of the exemplary watercraft 302. The shorter length of the shaft 360 alters the leverage on the propulsion member 340 but allows the desired placement for the foot driven apparatus 350. While the shaft 360 is illustrated herein as being of suitable length to accommodate the foot driven apparatus 350 as shown, it is contemplated within the scope of the present invention that the shaft 350 could be manufactured to a longer length to accommodate an exemplary watercraft 302 having a alternate seating arrangement.

While several exemplary watercraft have been illustrated herein, it is contemplated within the scope of the present invention that the hydro-propulsion system 100 could be integrated with numerous types of exemplary watercraft. More specifically but not by way of limitation a canoe, kayak, rowboat, modified surfboard or floating pool toy. Additionally it is contemplated within the scope of the present invention that various configurations of the leverage apparatus discussed herein, more specifically the handle 60, float apparatus 250 and foot driven apparatus 350 could be utilized in conjunction with one another to propel the exemplary watercraft.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A hydro-propulsion apparatus operably coupled to a watercraft comprising:
   at least one fluid chamber, said at least one fluid chamber having at least one wall, a top and a bottom forming an interior volume, said at least one fluid chamber having an aft opening;
   at least one inlet valve, said at least one inlet valve operable to allow water to flow into said interior volume of said at least one fluid chamber, said at least one inlet valve configured to substantially inhibit water disposed within said interior volume from flowing outward through said inlet valve;
   at least one propulsion member, said at least one propulsion member movably mounted within said interior volume of said at least one fluid chamber, said at least one propulsion member having a first end and a second end, said at least one propulsion member operable to laterally oscillate within said interior volume so as to displace water therefrom via said aft opening;
   a shaft, said shaft having a first portion and a second portion, said first portion of said shaft being operably coupled to said first end of said at least one propulsion member, said shaft being at least partially rotatable;
   a plurality of vanes, said vanes being mounted proximate said aft opening, said vanes operable to substantially inhibit water turbulence as water flows outward via said aft opening;
   a leverage apparatus, said leverage apparatus being connected to said second portion of said shaft, said leverage apparatus being disposed within the watercraft, said leverage apparatus operable to at least partially rotate said shaft so as to laterally oscillate said at least one propulsion member; and
   wherein the discharge of water from said aft opening of said at least one fluid chamber is operable to propel the watercraft.

2. The hydro-propulsion apparatus as recited in claim 1, wherein the hydro-propulsion apparatus is operably coupled to at least one of the following types of watercraft: canoe, kayak, rowboat, modified surfboard or floating pool toy.

3. The hydro-propulsion apparatus as recited in claim 2, wherein said at least one fluid chamber is operably coupled to the watercraft in at least one of the following positions: aft of the watercraft, port side of the watercraft, starboard side of the watercraft or to the bottom of the watercraft.

4. The hydro-propulsion apparatus as recited in claim 3, wherein said at least one fluid chamber is generally triangular in shape.

5. A watercraft having a hydro-propulsion system comprising:
   a hull, said hull having a bow and a stern;
   at least one fluid chamber, said at least one fluid chamber having a plurality of walls, a bottom and a top forming an interior volume, said at least one fluid chamber having a first end and a second end, said interior volume operable to receive water therein, said at least one fluid chamber having an first opening, said first opening proximate said second end of said at least one fluid chamber, said first opening operable to allow water disposed within said interior volume to expel from said interior volume;
   a plurality of inlets, said plurality of inlets being formed within said plurality of walls of said at least one fluid chamber, said plurality of inlets being generally rectangular in shape, said plurality of inlets operable to allow water to flow into said interior volume of said at least one fluid chamber, said plurality of inlets being proximate said first end of said at least one fluid chamber, wherein said plurality of inlets further include a gate member, said gate member being hingedly secured to said plurality of inlets, said gate member operable to control the flow of water into said interior volume of said at least one fluid chamber;
   a plurality of directional vanes, said directional vanes being mounted proximate said first opening, said directional vanes being generally square in shape, said directional vanes being configured in a substantially perpendicular manner, said directional vanes operable to reduce the turbulence of the water flow exiting said first opening;

at least one propulsion member, said at least one propulsion member disposed within said interior volume of said at least one fluid chamber, said at least one propulsion member being generally rectangular in shape, said at least one propulsion member having a first end and a second end, said at least one propulsion member being movably mounted within said interior volume of said at least one fluid chamber, said at least one propulsion member operably to laterally oscillate so as to discharge water disposed within said interior volume of said at least one fluid chamber from said first opening; and a leverage apparatus, said leverage apparatus being disposed within the watercraft, said leverage apparatus operably coupled to said at least one propulsion member, said leverage apparatus operable to laterally oscillate said at least one propulsion member.

6. The watercraft as recited in claim 5, and further including a shaft, said shaft being generally rod-shaped, said shaft having a first end and a second end, said first end operably coupled to said leverage apparatus, said second end operably coupled to said at least one propulsion member, said shaft being rotatable.

7. The watercraft as recited in claim 6, wherein said at least one fluid chamber is smaller in width proximate said first end and wherein said first end is generally oriented in the same direction as the bow of said hull.

8. The watercraft as recited in claim 7, wherein the hydro-propulsion apparatus is mounted to the watercraft in at least one of the following positions: aft of the watercraft, port side of the watercraft, starboard side of the watercraft or to the bottom of the watercraft.

9. A hydro-propulsion system operably coupled to a watercraft having a bow and a stern wherein the hydro-propulsion system is operable to provide thrust to move the watercraft through water comprising:

at least one fluid chamber, said at least one fluid chamber having an interior volume operable to receive water therein, said at least one fluid chamber having a first wall having a first end and a second end, said second wall having a first end and a second end, said first end of said first wall being coupled to said first end of said second wall forming an apex, said at least one fluid chamber having a third wall, said third wall being connected to said first wall and said second wall proximate said second end of said first wall and proximate said second end of said first wall, said at least one fluid chamber further including an aft opening, said aft opening being formed within said third wall, said aft opening configured to allow water to flow outward from said interior volume, said apex being oriented directionally with the bow of the watercraft;

a first inlet, said first inlet being formed in said first wall, said first inlet being generally rectangular in shape, said first inlet having and opening, said first inlet operable to allow water to flow into said interior volume;

a second inlet, said second inlet being formed in said second wall, said second inlet being generally rectangular in shape, said second inlet having an opening, said second inlet operable to allow water to flow into said interior volume;

a first gate member and a second gate member, said first gate member operably mounted to said first inlet, said second gate member operably mounted to said second inlet, said first gate member and said second gate member hingedly attached to said first inlet and said second inlet respectively, said first gate member and said second gate member for controlling the uni-directional flow of water into said interior volume of said at least one fluid chamber;

a plurality of directional vanes, said directional vanes being mounted proximate said aft opening, said directional vanes being generally square in shape, said directional vanes being configured in a substantially perpendicular manner, said directional vanes operable to reduce the turbulence of water flow exiting said aft opening;

a propulsion member, said propulsion member movably mounted within said interior volume of said at least one fluid chamber, said propulsion member being generally rectangular in shape, said propulsion member having a first end and a second end, said first end of said propulsion member being proximate said apex, said propulsion member configured laterally oscillated at said second end so as to discharge water from said aft opening; and at least one leverage apparatus, said at least one leverage apparatus being mounted adjacent to said at least one fluid chamber, said at least one leverage apparatus being operably coupled to said propulsion member, said at least one leverage apparatus having a first portion and a second portion, said at least one leverage apparatus operably connected to said at least one fluid chamber, said at least one leverage apparatus operable to move in an upwards-downwards direction wherein the upwards-downwards direction of said at least one leverage apparatus laterally oscillates said propulsion member.

10. The hydro-propulsion system as recited in claim 9, wherein the hydro-propulsion system is mounted to the watercraft in at least one of the following positions: aft of the watercraft, port side of the watercraft, starboard side of the watercraft or to the bottom of the watercraft.

11. The hydro-propulsion system as recited in claim 10, wherein said first portion of said leverage apparatus is buoyant and said second portion of said leverage apparatus is non-buoyant.

* * * * *